US007576525B2

(12) United States Patent
So et al.

(10) Patent No.: US 7,576,525 B2
(45) Date of Patent: Aug. 18, 2009

(54) SUPPLY POWER CONTROL WITH SOFT START

(75) Inventors: John So, Fremont, CA (US); David Yen Wai Wong, San Jose, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 220 days.

(21) Appl. No.: 11/749,714

(22) Filed: May 16, 2007

(65) Prior Publication Data

US 2008/0094865 A1 Apr. 24, 2008

Related U.S. Application Data

(60) Provisional application No. 60/912,920, filed on Apr. 19, 2007, provisional application No. 60/853,282, filed on Oct. 21, 2006.

(51) Int. Cl.
*G05F 1/569* (2006.01)
*H02H 9/02* (2006.01)

(52) U.S. Cl. ....................... 323/276; 323/901; 323/908; 361/93.9

(58) Field of Classification Search ................. 323/273, 323/274, 275, 277, 280, 281, 901, 908; 363/49; 361/87, 93.9
See application file for complete search history.

(56) References Cited

U.S. PATENT DOCUMENTS

| | | | | |
|---|---|---|---|---|
| 3,534,353 | A | 10/1970 | Calkin et al. | |
| 3,859,591 | A | 1/1975 | Saunders | |
| 3,892,929 | A | 7/1975 | Shylo | |
| 4,783,137 | A | 11/1988 | Kosman et al. | |
| 5,282,125 | A | 1/1994 | Dhyanchand et al. | |
| 5,955,915 | A | 9/1999 | Edwards | |
| 6,163,708 | A | 12/2000 | Groe | |
| 6,170,241 | B1 | 1/2001 | Shibilski et al. | |
| 6,617,833 | B1 * | 9/2003 | Xi | 323/282 |
| 6,636,025 | B1 | 10/2003 | Irissou | |
| 6,762,917 | B1 | 7/2004 | Verbiest et al. | |
| 7,248,026 | B2 * | 7/2007 | Ritter | 323/281 |
| 7,459,891 | B2 * | 12/2008 | Al-Shyoukh et al. | 323/274 |

(Continued)

OTHER PUBLICATIONS

Start-Up Current-Limiters for Supercapacitors in PDAs and Other Portable Devices; cap-XX Application Note No. 1002; Feb. 2002; pp. 1-14; Revision 2.1; cap-XX Pty. Ltd.; Lane Cove, NSW, Australia.

(Continued)

*Primary Examiner*—Gary L Laxton
(74) *Attorney, Agent, or Firm*—Sheppard, Mullin, Richter & Hampton LLP

(57) ABSTRACT

Charge storage devices (e.g., batteries or supercapacitors) need to be charged from time to time. In an apparatus, to protect a charge storage device as well as the supply used to charge it, the apparatus typically includes power loop control circuitry. One approach to implementing the power loop control employs a temperature sensor in combination with soft start circuitry in order to protect the circuitry from a rapidly increasing temperature when charge current increases. The soft start circuitry allows for controlled step-wise increase and regulation of the current. The approach preferably allows for selecting the number and resolution of such incremental steps. Various embodiments of the invention include devices and methods for controlling power and may take into account temperature in step-wise regulation of the charge current.

47 Claims, 10 Drawing Sheets

U.S. PATENT DOCUMENTS

| | | | |
|---|---|---|---|
| 2004/0075600 | A1 | 4/2004 | Vera et al. |
| 2005/0059359 | A1 | 3/2005 | Dornbusch |
| 2005/0243894 | A1 | 11/2005 | Chen et al. |
| 2007/0008795 | A1 | 1/2007 | Tsukada |

OTHER PUBLICATIONS

GU, Wek, improve that Mobile Phone Camera; Replace the Anemic LED Flash with a Xenon Flashlamp and a Tiny Photoflash Capacitor Charger; Linear Technology Magazine; Dec. 2006; pp. 14-19; vol. XVI, No. 4.

AAT4529 PCMCIA Current Limit Interface, Analogic Tech; Apr. 2006: pp. 1-7.

PCT International Search Report and Written Opinion dated Mar. 28, 2008 for International Application No. PCT/US07/81276.

PCT International Search Report and Written Opinion dated May 5, 2008 for International Application No. PCT/US07/81300.

PCT International Search Report and Written Opinion dated May 7, 2008 for International Application No. PCT/US07/81292.

PCT International Search Report and Written Opinion dated May 7, 2008 for International Application No. PCT/US07/81563.

* cited by examiner

SUPPLY POWER CONTROL WITH SOFT START

REFERENCE TO EARLIER APPLICATION

This application claims the benefit of and incorporates by reference U.S. Provisional Application, Ser. No. 60/853,282 filed Oct. 21, 2006, titled "Power Loop Control with Soft Start" and U.S. Provisional Application, Ser. No. 60/912,920 filed Apr. 19, 2007 titled "Supply Power Control with Soft Start."

FIELD OF THE INVENTION

The present invention relates generally to power management of system loads and charge storage devices and more specifically to managing power as a function of temperature with an application such as regulating charge current to a power source.

BACKGROUND

Power control is the practice of limiting arid regulating power where, in one instance, power stays below a predetermined power limit. As power is a function of current and voltage, power control can include current control. The typical purpose of current control is to protect the circuit generating or transmitting the current (e.g., the power supply) from harmful effects due to, for example, a short circuit. When using a power source to charge an ideal charge storage device, e.g., an ideal capacitor, the current approaches infinity. FIG. 1 illustrates such ideal charge current with reference to a desired current limit. Even in a real capacitor, the current surge needed to charge the capacitor may be larger than the power supply can produce. Unless the real capacitor is current limited, current surge may blow a fuse. If a battery is used as the power source, the battery may see almost a short circuit because of the initial surge in charge current to the load. Furthermore, the temperature tends to rise quickly once the charge current starts to flow.

Therefore, there is a need for improved design of power control devices. One desired aspect of such design might be to substantially increase the capability of controlling the temperature as the charge current starts to flow, including limiting the charge power in order to reduce and regulate the temperature in a controlled manner.

SUMMARY

The present invention is based, in part, on the foregoing observations and in accordance with its purpose various embodiments of the invention include devices and methods for controlling power. Generally, the various implementations of a device for controlling power take into account temperature as a charge storage device is being charged. Various implementations of a device for controlling power can use a temperature sensor integrated with a soft start component. The soft start component allows for controlling the power in incremental steps. As a possible alternative to the aforementioned designs, which may be inflexible, of limited use, or both, various implementations may use an integrated circuit (IC) or a number of discrete components that are typically flexible and efficient in controlling current and thus power. To illustrate, a number of examples are provided below.

According to one embodiment, a device for controlling power comprises: a pass element and a power loop control circuit. The power loop control circuit includes a soft start controller and a soft start component. The soft start controller is adapted to produce a control signal corresponding to incremental steps of a charge current through the pass element. The soft start component is adapted to manage charge current increases in incremental steps up to a current limit in response to the control signal.

In such device, the control signal may include one or more control bits. The soft start component may include one or more current switches adapted to turn ON and OFF in response to the control signal. Such current switches may include transistors. The soft start controller may include a comparator and logic circuitry. The logic circuitry may include a counter. The comparator maybe adapted to produce a logic signal (e.g., an UP/DN signal) for prompting the logic circuitry to increase and decrease the incremental steps (e.g., prompting the counter to count up and down between an upper and a lower limit). The logic circuitry may be adapted to adjust the control signal when increasing and decreasing the incremental steps. The counter may, for example, be adapted to adjust the control bits when counting up and down. The counter may be adapted to count only down if it reaches the upper limit and to count only up if it reaches the lower limit. The soft start controller may also include a constant current source operatively coupled to the comparator.

The device may also include a temperature sensor operatively coupled to the soft start controller. The temperature sensor may be adapted to produce a sensor signal in response to which the comparator produces a logic signal (e.g., an UP/DN signal). Moreover, the device may include a zero coefficient temperature voltage reference. The comparator may be operatively connected to the temperature sensor and to the zero coefficient temperature voltage reference and adapted to produce the logic signal in response thereto. The temperature sensor may include one or more temperature sensitive elements operatively coupled in series with each other. Each temperature sensitive element may have a forward voltage drop that is inversely proportional to its absolute temperature. Collectively, the temperature sensitive elements maintain a predetermine temperature level by regulating the charge current between the incremental steps. The temperature sensitive elements may include a bipolar, junction diode, a thermistor, or a transistor or a combination of one or more thereof. The temperature sensor may be incorporated, in full or in part, within the power loop control circuit of the device.

The device may further include a current limit controller with current limit detector operatively coupled to the pass element. The current limit detector is operative to detect the current limit and to manage the charge current by limiting it to at or below the current limit. In such device, the power loop control circuit may be adapted to regulate the charge current once it is at or about the current limit such that the power dissipated across the pass element does not exceed the predetermined power limit. The power loop control circuit may also be adapted to produce the regulated charge current to a charge storage device, a system load, or both. The pass element may include one or more transistors including one or more of a bipolar junction transistor (BJT), a junction field effect transistor (JTET), a metal oxide semiconductor FET (MOSFET), and an insulated gate bipolar transistor (IGBT).

In one implementation of the device, one or more of the soft start controller and the soft start component may be implemented using a microcontroller. The microcontroller may be operatively connected at its input to an analog-to-digital converter (ADC) and at its output to a digital-to-analog converter (DAC). Such device may further comprise a temperature sensor operatively coupled to the ADC of the microcontroller. The DAC may then be operatively coupled to the pass element.

According to another embodiment, a method for controlling power comprises: increasing a charge current through a pass element in incremental steps up to a current limit, regulating the charge current once it is at or about the current limit, and outputting the increased and regulated charge current to a charge storage device, a system load, or both. Increasing the charge current is performed by producing a control signal in a soft start controller. Regulating the charge current is performed in a power loop control circuit.

In such method, increasing the charge current may be based on a resolution of the incremental steps. The resolution may be related to the control signal and, in this instance, it may be related to a number of one or more control bits of the control signal. Increasing the charge current may include various actions. It may include sensing a temperature of the power loop control circuit. It may also include maintaining a predetermined temperature level at the power loop control circuit by regulating the charge current between the incremental steps. It may further include increasing and decreasing the charge current by turning ON and OFF one or more current switches with the soft start controller in response to the produced control signal. Regulating may include detecting the current limit and controlling the charge current to maintain it at or below the current limit.

According to yet another embodiment, a device for controlling power comprises a pass element and a power loop control circuit. The power loop control circuit includes a soft start controller and a soft start component. The soft start controller includes an output for a control signal corresponding to incremental steps of the current through the pass element. The soft start component is adapted to manage current increases in incremental steps up to a current limit in accordance with adjustments in the control signal. The current limit is associated with a predetermined power limit value of power dissipated across the pass element.

In such device, the control signal may likewise include one or more control bits. The soft start controller may include logic circuitry adapted to produce the adjustable control signal at the output. The soft start controller may also include a comparator and a constant current source operatively coupled to the comparator. The soft start component may include one or more current switches with turn ON and OFF states responsive to the control signal.

This device may also include a temperature sensor operatively coupled to the soft start controller and adapted to produce a sensor signal in response to which the comparator may produce an UP/DN signal for adjusting the control signal. The device may further include a voltage reference. The comparator may be operatively connected to the temperature sensor and voltage reference and adapted to produce the UP/DN signal. Furthermore, the device may include a current limit controller with current limit detector operatively coupled to the pass element and operative to detect the current limit and to manage the current by limiting it to at or below the current limit.

In such device, the soft start controller, the soft start component, or both, may be implemented using a microcontroller. The microcontroller may be operatively coupled at its input to an ADC and at its output to a DAC. The device may also include a temperature sensor. The ADC may be operatively coupled to the temperature sensor. The DAC maybe operatively coupled to the pass element. The power loop control circuit may be adapted to regulate the current once it is at or about the current limit such that the power dissipated across the pass element does not exceed the predetermined power limit value. The power loop control circuit may be adapted to produce the regulated current for a charge storage device, a system load, or both.

In these embodiments, various possible attributes may be present. The current may be a charge current. The current limit may be associated with a predetermined power limit value of power dissipated across the pass element. The number of control bits may he related to the number of incremental steps, a predetermined resolution, with which the soft start controller allows the charge current to approach the current limit, or both. The current switches may include transistors. The device may be embodied in an IC or as a functional block in an IC. The IC may be divided into die areas, and each die area may be adapted for devices of a different scale. A temperature sensor may be placed on a die area where a heat source including the pass element is present. Such IC may also be adapted for use in a mobile device.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and, together with the description, serve to explain its principles. Wherever convenient, the same reference numbers will be used throughout the drawings to refer to the same or like elements.

DETAILED DESCRIPTION

Charge storage devices such as those used in mobile devices (e.g., batteries or supercapacitors) tend to provide energy that lasts a limited period of time. From time to time, they therefore need to he charged using a supply. During such charging, the temperature may rise rapidly as current flows to the charge storage device. It may therefore be of interest to limit the amount of power, and thus current, flowing to the charge storage device to control the temperature.

Figure 1:
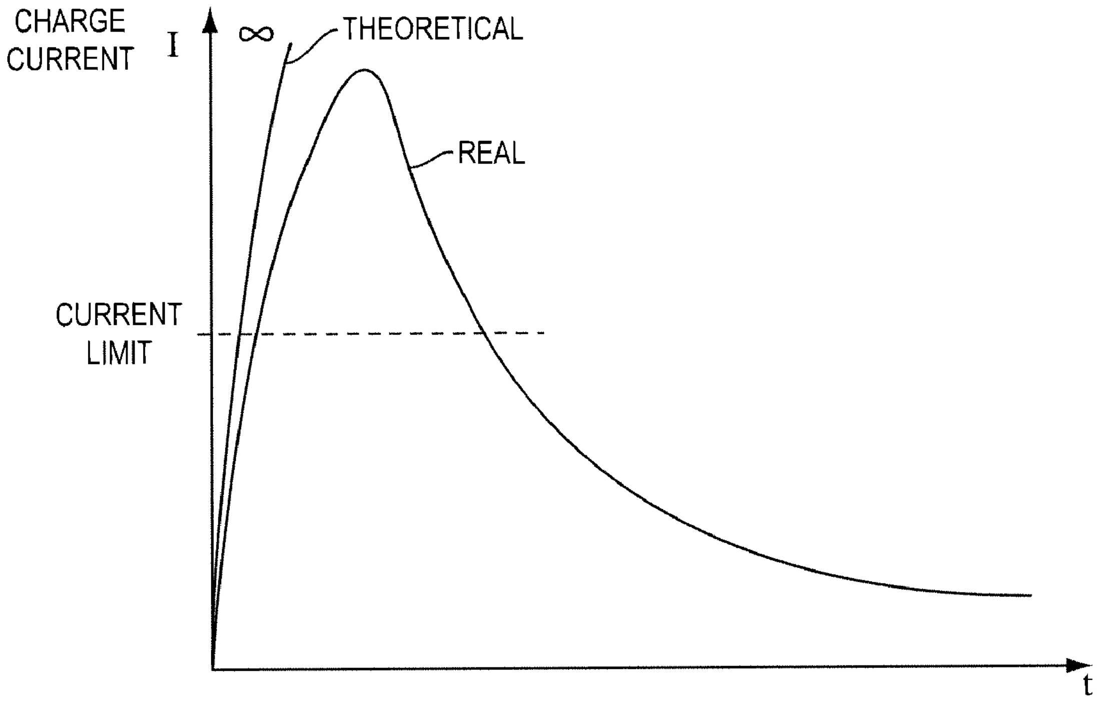
FIG. 1 (PRIOR ART)
FIG. 1 is a diagram illustrating ideal charge current with reference to a desired current limit.
Figure 2:
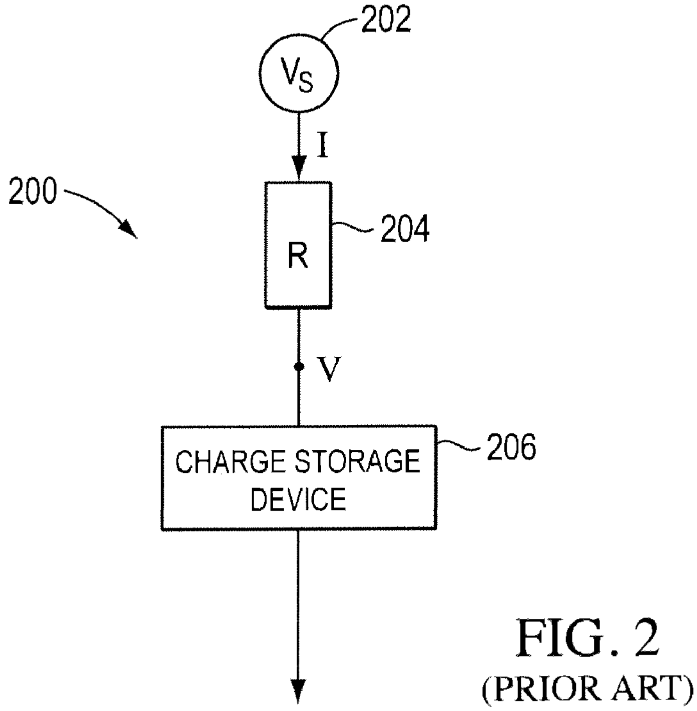
FIG. 2 (PRIOR ART)
FIG. 2 is a block diagram of a conventional charge power control scheme.
Figure 3A:
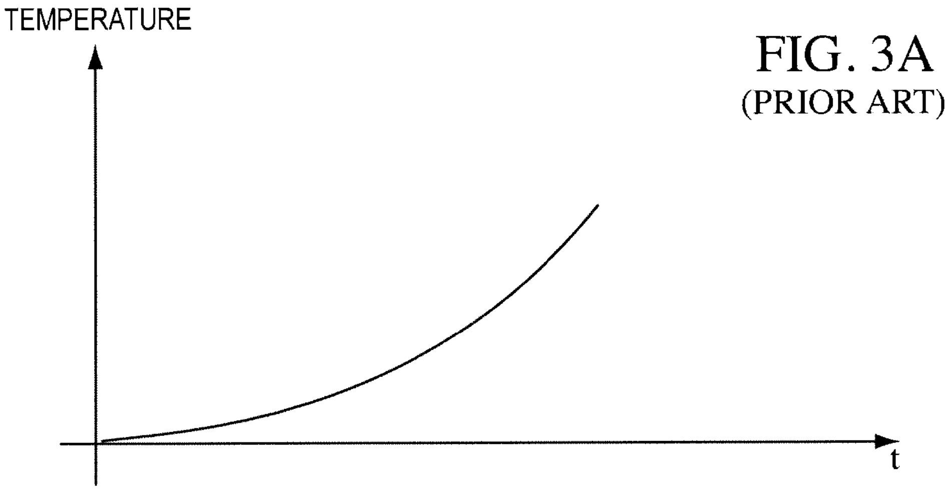
FIG. 3A (PRIOR ART)
FIG. 3A is a diagram illustrating the common temperature behavior over time of a pass element and surrounding components once charging starts.

FIG. 2 is a block diagram of a conventional charge power control scheme 200. This scheme 200 includes a supply 202, a pass element 204, and a charge storage device 206. Generally, a pass element is a controlled variable resistance device in series with a source of direct current (DC) power (e.g., supply 202). A pass element may be driven by an amplified error signal and is operative to increase its resistance when the output current is to be lowered and to decrease its resistance when the output current is to be raised. In FIG. 2, the voltage across the pass element 204 is the resistive value, R, multiplied by the current, I, flowing through the pass element 204, such current being the error signal amplified by R. The voltage, V, across the charge storage device 206 is the difference between the voltage, $V_S$, from the supply 202 and R×I. As the supply 202 is turned on, the current to the charge storage device 206 may increase rapidly (see FIG. 1). Additionally, as shown in FIG. 3A, the temperature of the pass element 204 and surrounding components tends to rise rapidly once charging starts. It may be advantageous to limit the current, I, flowing to the charge storage device 206 and the temperature in order to protect components of the charge power scheme 200 from potential damage.

Figure 3B:
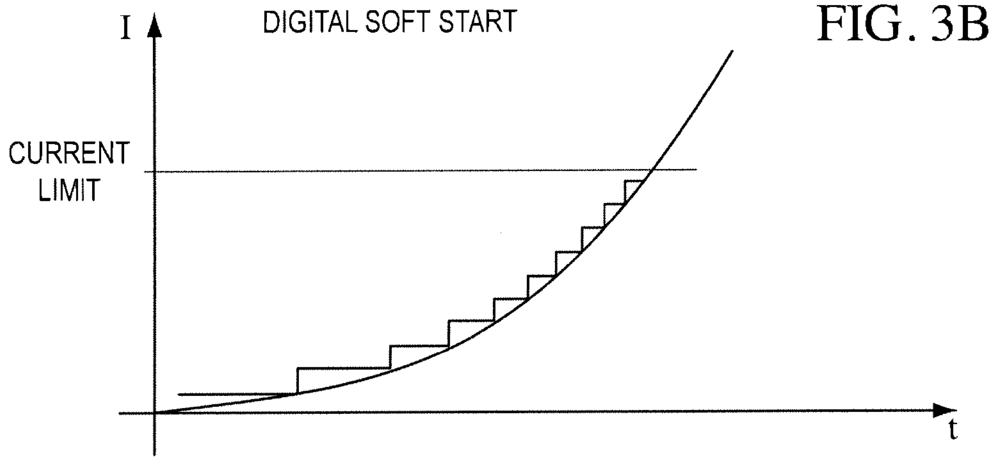
FIGS. 3B and 3C are diagrams illustrating digital and analog soft start behavior, respectively, according to exemplary embodiments of the invention.
Figure 3C:
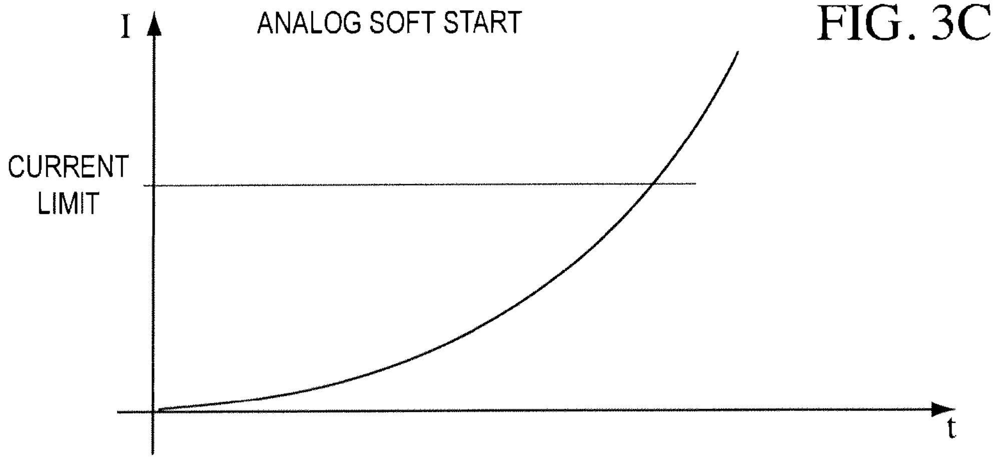

Accordingly, various embodiments of the invention include devices and methods for limiting power to a charge storage device in order to control current, temperature, or both during charging. A charge power control scheme may include temperature control combined with a soft start component to ease the temperature transient in a controlled manner. FIGS. 3B and 3C are diagrams illustrating digital and analog soft start behavior, respectively, according to exemplary embodiments of the invention.

In a digital soft start implementation, the operation of which is illustrated in FIG. 36, 2n steps divide the charge current into incremental steps. Each step produces a different voltage from a soft start component in the charge power control scheme. The soft start, component increases the level of current, preferably slowly, e.g., step-wise. With n=3, 4, 5, 6, etc., the digital soft start component may include $2^n$, or, 8, 16, 32, 64, etc. incremental steps.

The soft start component allows the temperature to increase gradually, easing the temperature transient. Essentially, a digital soft start component allows the temperature to increase in a quantized controlled manner. Combining soft start with, the temperature control enables the step-wise controlling of the current level. An analog soft start component yields substantially similar performance as that of the digital soft start component except that the changes are typically smooth, rather than step-wise incremental. Analog soft start is shown in FIG. 3C.

Figure 4:
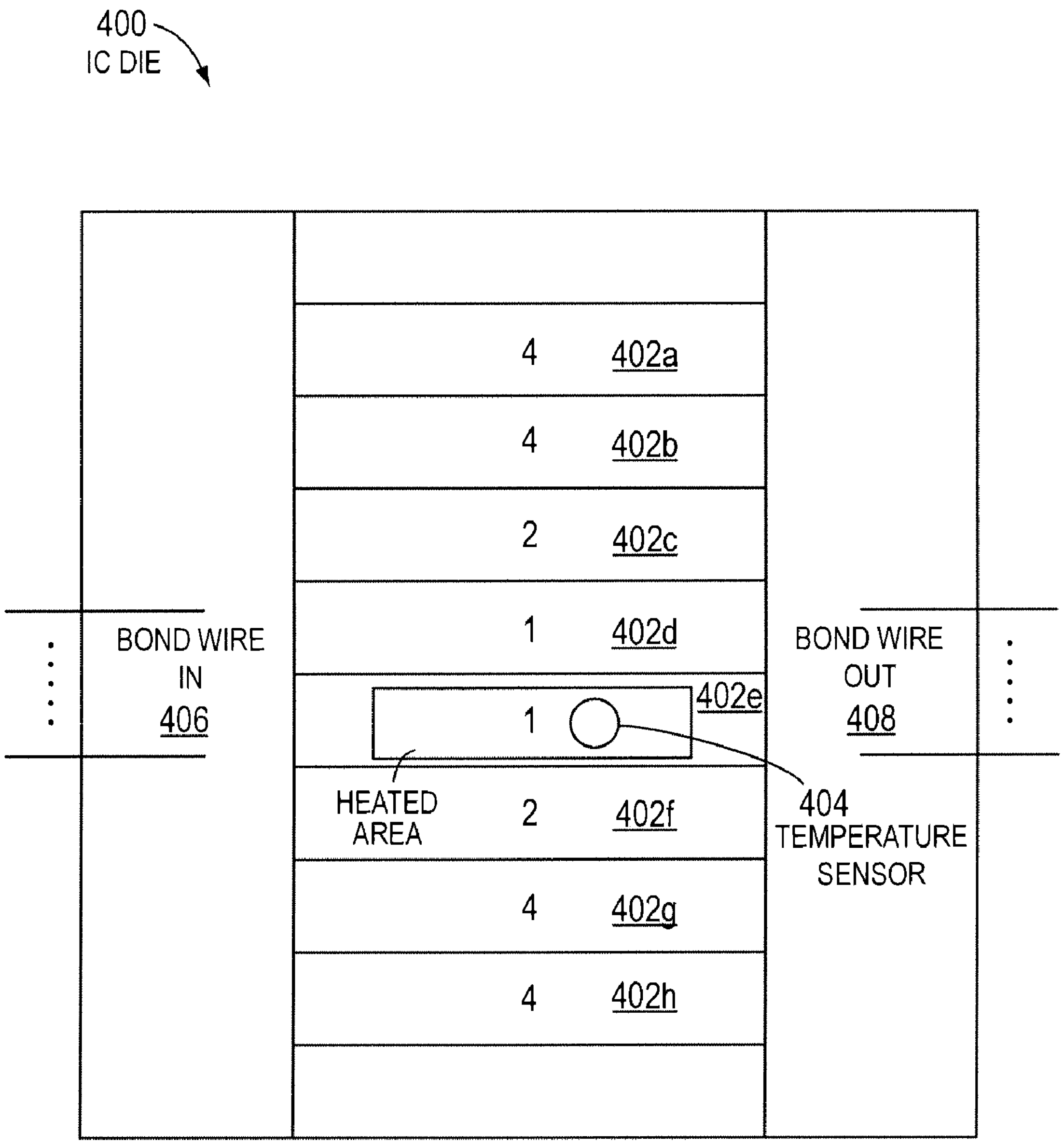
FIG. 4 is a structural diagram of a charge power control device on an integrated chip (IC) die, according to one embodiment of the invention.

One configuration of a charge power control scheme utilizes a temperature sensor for thermal cycling. FIG. 4 is a structural diagram of a charge power control device implemented on an integrated chip (IC) die 400, according to one embodiment of the invention. The IC die area may be divided into areas 402*a-h*. Each die area 402*a-h* may be adapted for devices of a different scale (i.e., size). As will be described with reference to FIGS. 6-10, the charge power control scheme may include control circuitry adapted to limit the charge current. Such circuitry may be implemented using transistors of different scales. The transistors may be placed in the different die areas 402*a-h*. The IC die 400 may further include one or multiple bond wires in 406 and one or multiple bond wires out 408 coupled to opposite sides of the die areas 402*a-h*. The bond wires 406, 408 are adapted to provide interconnections between the IC die 400 and external components. The IC die 400 may further include a temperature sensor 404 placed in a die area 402 that is heated, e.g., a die area 402*e* in which a heat source may be present. Specifically, the silicon area carrying components that dissipate power tends to heat up. In the charge power control device, the area 402*e* where charge power is dissipated is sensitive to the temperature rise. Therefore, a temperature sensor 404 is located at or substantially near the area most sensitive to the heat (i.e., 402*e*).

Figure 5:
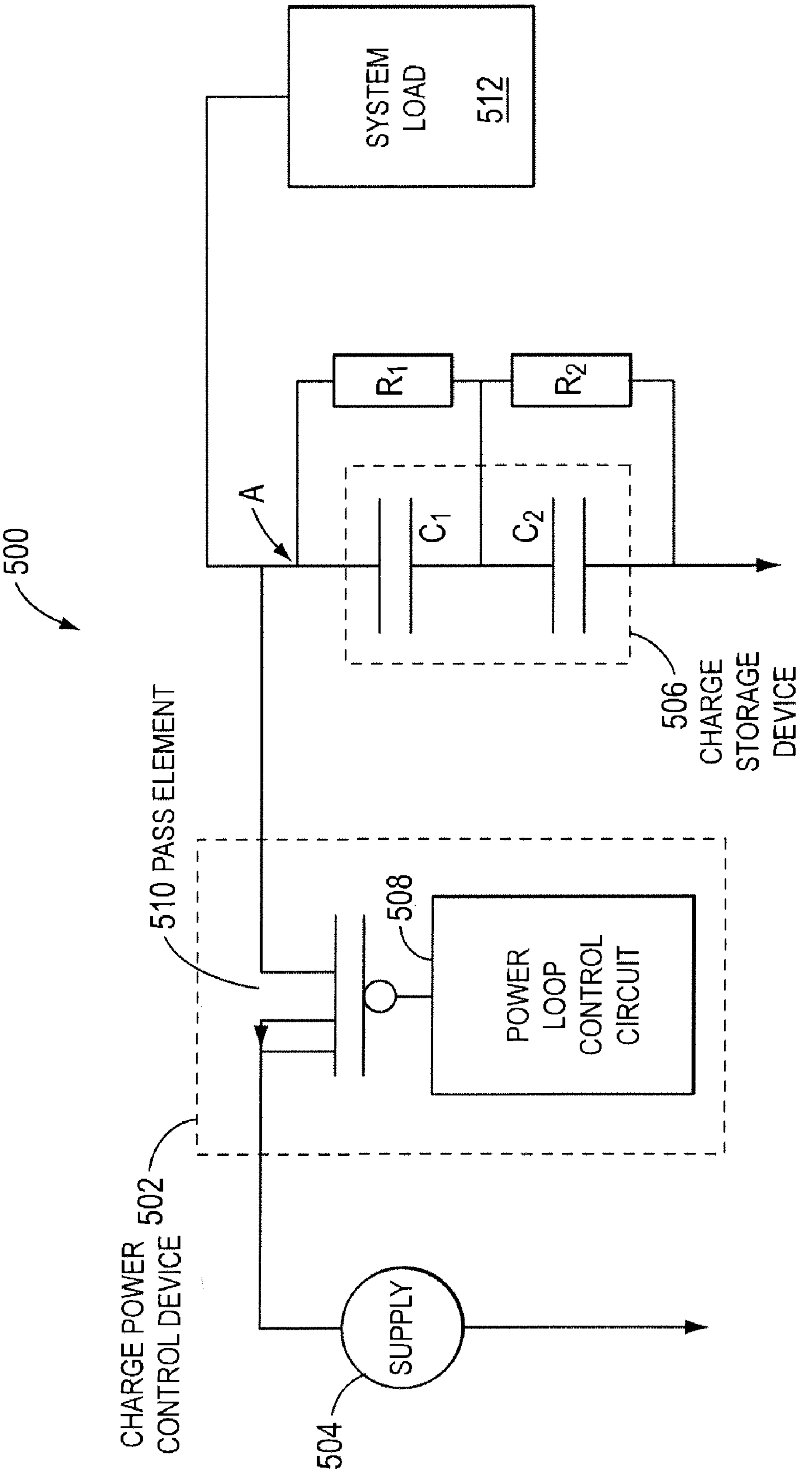
FIG. 5 is a block diagram of a charge power control scheme, according to one embodiment of the invention.

The temperature sensor may cooperate with control circuitry to limit the charge power. One approach to limiting power flowing to a charge storage device is to use a power loop control circuit. FIG. 5 is a block diagram of a charge power control scheme 500, according to one embodiment of the invention. The charge power control scheme 500 includes a charge power control device 502 that interfaces between a power source for supplying charge power, i.e., a supply 504, a charge storage device 506, a system load 512, or both.

The supply 504 may comprise any power source, such as a battery, chemical fuel cell, DC power supply, or any other energy storage system. The system load 512 may comprise any device capable of drawing current in operation. Examples of system loads 512 include a PCMCIA card and a camera flash LED.

The charge power control device 502 may be implemented as a supercapacitor or ultracapacitor charge IC, one example of which is illustrated in FIG. 4. As implemented, the charge power control device 502 includes a power loop control circuit 508 and a pass element 510. The pass element 510 may include multiple pass element components. Examples of pass element components include transistors, such as bipolar junction transistors (BJTs), junction field effect transistors (JFETs), metal oxide semiconductor FETs (MOSFETs), and insulated gate bipolar transistors (IGBTs). The charge power control device 502 controls power dissipation across the pass element 510 and, in turn, charge power to the charge storage device 506 and current to the system load 512. The elements of the power loop control circuit 508 are described in further detail with, reference to FIGS. 6-10.

The charge storage device 506 operates as an energy reservoir adapted to supply high levels of power such as burst power. Examples of charge storage devices 506 include boost converters and energy storage devices such as supercapacitors. Generally, a boost converter is a voltage step-up converter that is often regarded as a switching mode power supply. Energy storage devices, unlike boost converters, are based on charge storage and may be used as a power source. A supercapacitor is a type of high-energy storage device designed to be charged and recharged repeatedly and to provide instantaneous high discharge currents with rapid recharge between discharge operations. The charge storage device 506 may also include a combination of boost converter, supercapacitor, and any other type of energy storage device. In this embodiment, the charge storage device 506 includes a supercapacitor comprising two capacitors, C1 and C2, coupled in series and two resistors, R1 and R2, coupled in series with each other and in parallel with the capacitors C1, C2.

In operation, the charge power control scheme 500 limits the power dissipation across the pass element 510 to a level at or below a set power limit value. Assume that the power limit value is 2 Watt, i.e., that the IC package can tolerate a power of 2 Watt. However, the initial power dissipation may tend to be higher. The supply 504 may supply a voltage of 4.5 V. Power, P, is computed as voltage, V, multiplied by current, I, or P=V×I. The power may be, for example, 4.5 W (P=4.5 Volt×1.0 Ampere=4.5 Watt). If so, the power should be limited to below the power limit value of 2 W. Limiting the power may be achieved by limiting the current using the power loop control circuit 508. The power loop control circuit 508 may, for example, regulate the current so that the total power does not exceed 2 Watt. Such regulation may include cycling the current ON/OFF with temperature variations. Such regulation may further include regulating the current level.

Specifically, in operation, the voltage across the charge storage device 506, i.e., at terminal A, may ramp up as the charge storage device 506 is charging. Initially the voltage drop across the charge storage device 506 (i.e., capacitors C1, C2) may be zero Volt, i.e., the voltage at terminal A may be 0 V. Thus, before it is charged, the charge storage device 506 may behave like a short circuit to ground. Correspondingly, the charge current may be initially high, and the voltage across the pass element 510 may be high. The resulting power dissipated across the pass element 510 may likewise be high. When the voltage reaches, for example, 0.5 V, if the current is 0.5 A, then the power may be 2 W (computed as (4.5–0.5) V×0.5 A=2 W) across the pass element 510. The power across the pass element 510 may be monitored, and the charge power control device 502 may regulate the current to maintain the power at or below the power limit value of 2 Watt. That is, the charge power control device 502 may start controlling the current when the power dissipation across the pass element 510 reaches 2 Watt. As the voltage at terminal A increases, the voltage difference across the pass element 510 may decrease and may allow for a higher charge current. In one example, when the voltage at point A reaches 1.5 V, the voltage across the pass element 510 may equal 3 V (4.5–1.5 V). The charge power control device 510 may allow the current to increase up to the maximum while maintaining the power at or below the power limit value. Thus, the current may be allowed to increase to 0.66 A (2 W/3 V=0.66 A).

In another example, when the voltage at terminal A reaches 2.5 V, the charge power control device 502 may allow the current to increase to 1 A (2 W/(4.5–2.5) V=1 A). As shown in FIG. 1, the higher the current, the faster the charge, provided that the power does not exceed the power limit value. Thus, the charge power control device 502 may maintain the power at or below the power limit device of 2 Watt by increasing the current as the power across the pass element 510 decreases and as the voltage across the charge storage device 506 (at terminal A) increases. Hence, with, the charge power control device 502, the charge current is limited and regulated, protecting the power source (or battery, i.e., the supply 504).

Figure 6:
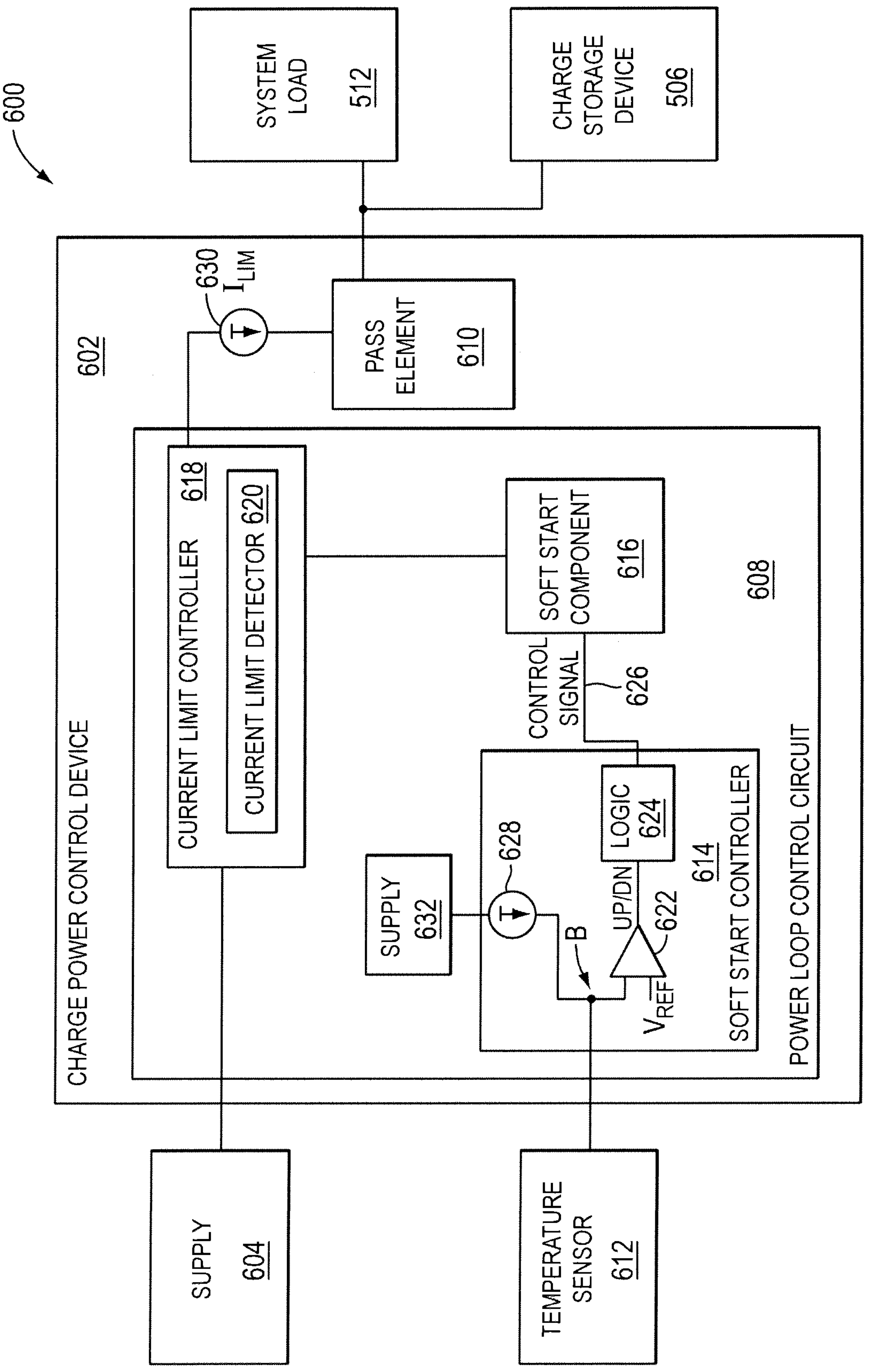
FIG. 6 is a block diagram of another charge power control scheme, according to one embodiment of the invention.

FIG. 6 is a block diagram of another charge power control scheme 600, according to one embodiment of the invention. The scheme 600 includes a supply 604, a charge power control device 602, a temperature sensor 612, the charge storage device 506, and the system load 512. The charge power control device 602 includes a power loop control circuit 608 having current limit detection and control capability, a pass element 610, and a current limit converter 630. The current limit converter 630 is operative to convert voltage to current. The supply 604 and temperature sensor 612 are both operatively coupled to the power loop control circuit 608, winch in turn is coupled to the current limit converter 630 and to the pass element 610. The pass element 610 may be coupled to the charge storage device 506, the system load 512, or both.

The power loop control circuit 608 includes a soft start controller 614, a soft start component 616, current limit controller 618 with a current limit detector 620, and a supply 632. The soft start controller 614 is operatively coupled to the temperature sensor 612, to the soft start component 616 and to the supply 632. The soft start component 616 is operatively coupled to the current limit controller 618. The current limit controller 618 is operatively coupled, via the current limit converter 630, to the pass element 610.

Figure 8:
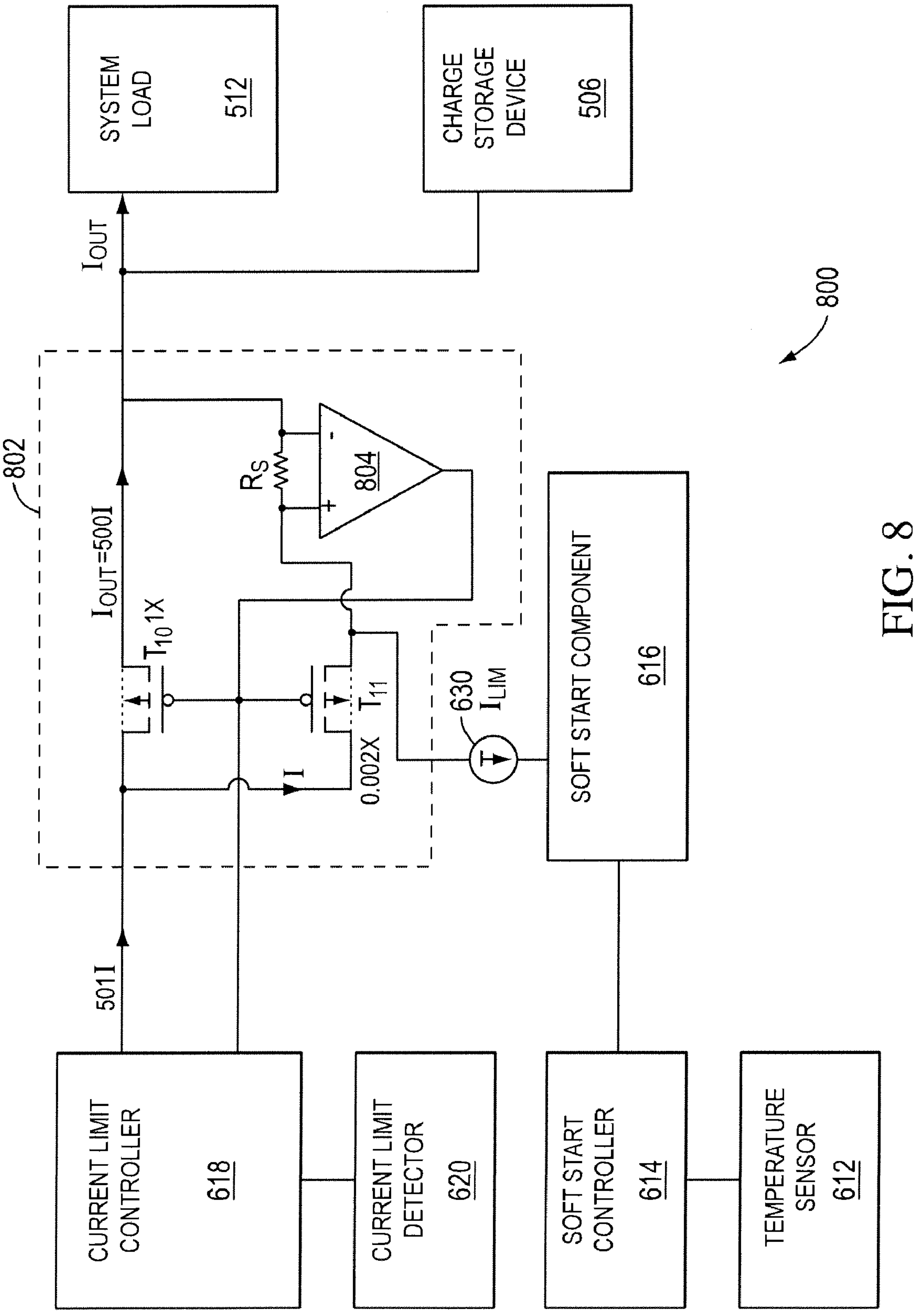
FIG. 8 is a diagram of a charge power control scheme, including circuit details of a pass element, according to one embodiment of the invention.
Figure 9:
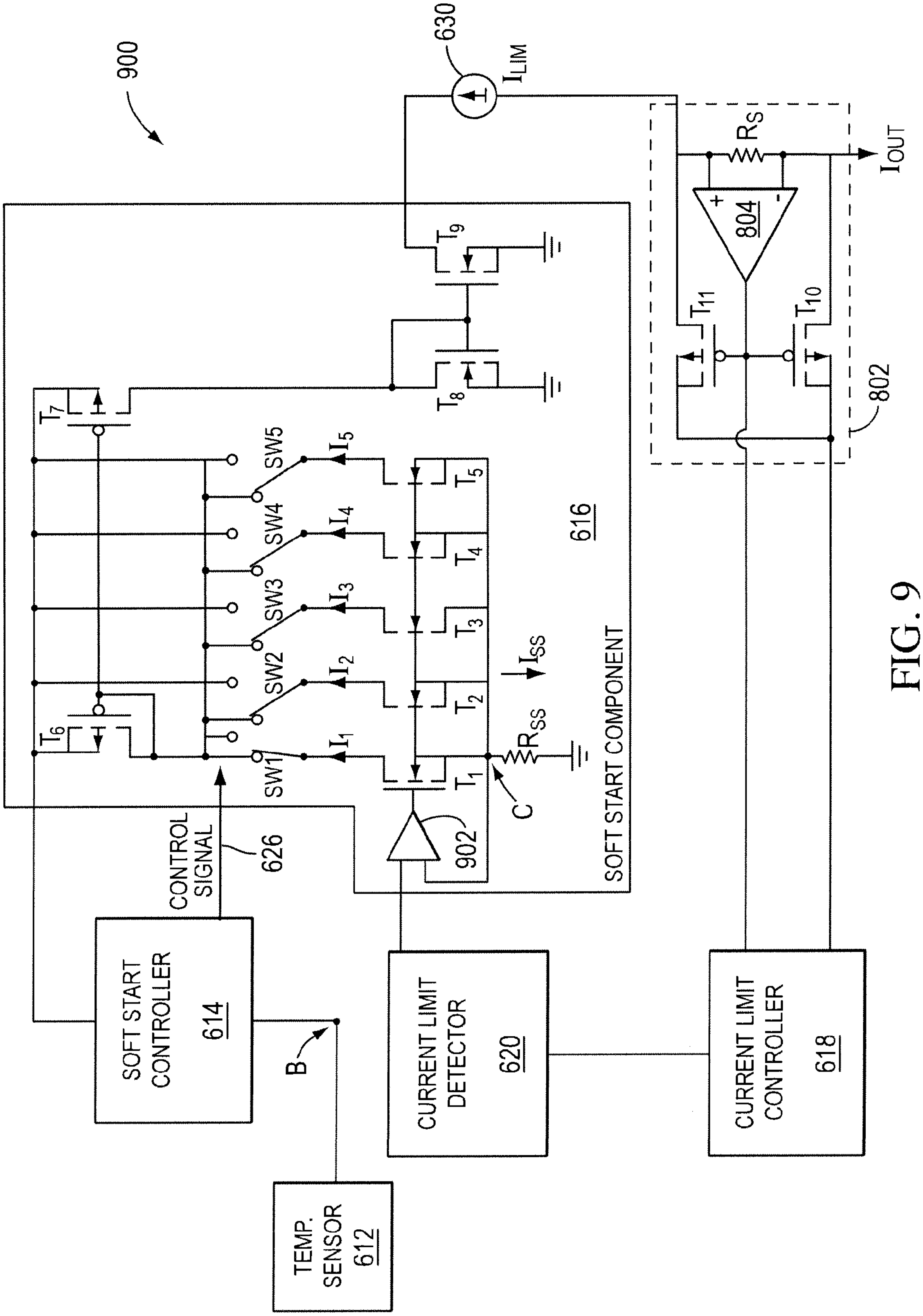
FIG. 9 is a diagram of the charge power control scheme of FIG. 8, including circuit details of a soft start component and a pass element, according to one embodiment of the invention.

The power loop control circuit 608 is adapted to regulate the current that is delivered to one or more elements of the charge power control device 602. The purpose of regulating the current is to protect the charge power control device 602 from harmful effects due to a short circuit event, overheating, or similar problem. The current limit controller 618 regulates the current relative to a predetermined upper current limit. It includes the current limit detector 620, which is operative to detect the level of the current limit and to communicate such current limit to the current limit controller 618. Various current limit detectors and current limit controllers would be familiar to a person of skill in the art. Exemplary implementations thereof are illustrated in FIGS. 8 and 9. However, any device capable of detecting and managing current may be used.

The soft start controller 614 and the current limit controller 618 are adapted to cooperate in limiting the current. Essentially, the current limit controller 618 is adapted to detect the current limit and to regulate the current to be reduced to and thereafter be maintained substantially at or below the current limit. The soft start controller 614 is adapted to aid in regulating the current as current charging starts by regulating the current in incremental current steps (digital or analog). Thus, in operation, the soft start controller 614 regulates the current by allowing it to be increased incrementally until the current substantially reaches the current limit. At such time, the current limit controller 618 regulates the current to be maintained substantially at or below the current limit.

In this instance, the soft start controller 614 includes a constant current source 628, a comparator 622 having two inputs and an output, and logic circuitry 624. The constant current source 628 is operatively coupled to, and adapted to receive current from, the supply 632. The constant current source 628 is also operatively, at its output, the temperature sensor 612 and to the comparator 622. The constant current source 628 is operative to supply current that flows through the temperature sensor 612 and produces voltage relative to the temperature at one input of the comparator 622. The constant current source 628 may be any current source or system capable of delivering and/or absorbing a substantially constant current. The other input of the comparator 622 is coupled to a temperature controlled voltage source, $V_{REF}$. The voltage at terminal B tends to decrease with temperature. The comparator 622 is adapted to compare the voltages at its inputs and to output to the logic circuitry 624 a signal, UP/DN, in response to the comparison. At its output, the comparator 622 is coupled, to the logic circuitry 624, which is adapted to increase and decrease the current increment steps. In one embodiment, the logic circuitry 624 includes a counter 624. In such embodiment, the counter 624 is operative to count up and down between an upper and a lower limit based on the UP/DN signal. The logic circuitry 624 is further adapted to output a control signal 626 to the soft start component 616. The soft start component 616 is adapted to receive such control signal 626 and to regulate the current, and thus the power, incrementally as shown in FIGS. 3B and 3C. The soft start component 616 includes one or more current switches (SW1, SW2, SW3, etc.), which may be opened or closed in response to the control signal 626. The soil start component 616 provides a gradually changing charge current until such current reaches the current limit value detected by the current limit controller 618. The charge power control device 602 thus allows for charge power to increase gradually and subject to limits rather than as a power surge. The constant current source 628, the comparator 622, the logic circuitry 624 and the soft start component 616 are described in further detail with reference to FIGS. 7-10. In some embodiments, the temperature sensor 612 may be external to the charge power control device 602, as illustrated in FIG. 6. In other embodiments, all or part of the temperature sensor 612 may be part of the charge power control device 602 (as illustrated in FIG. 4).

Figure 7:
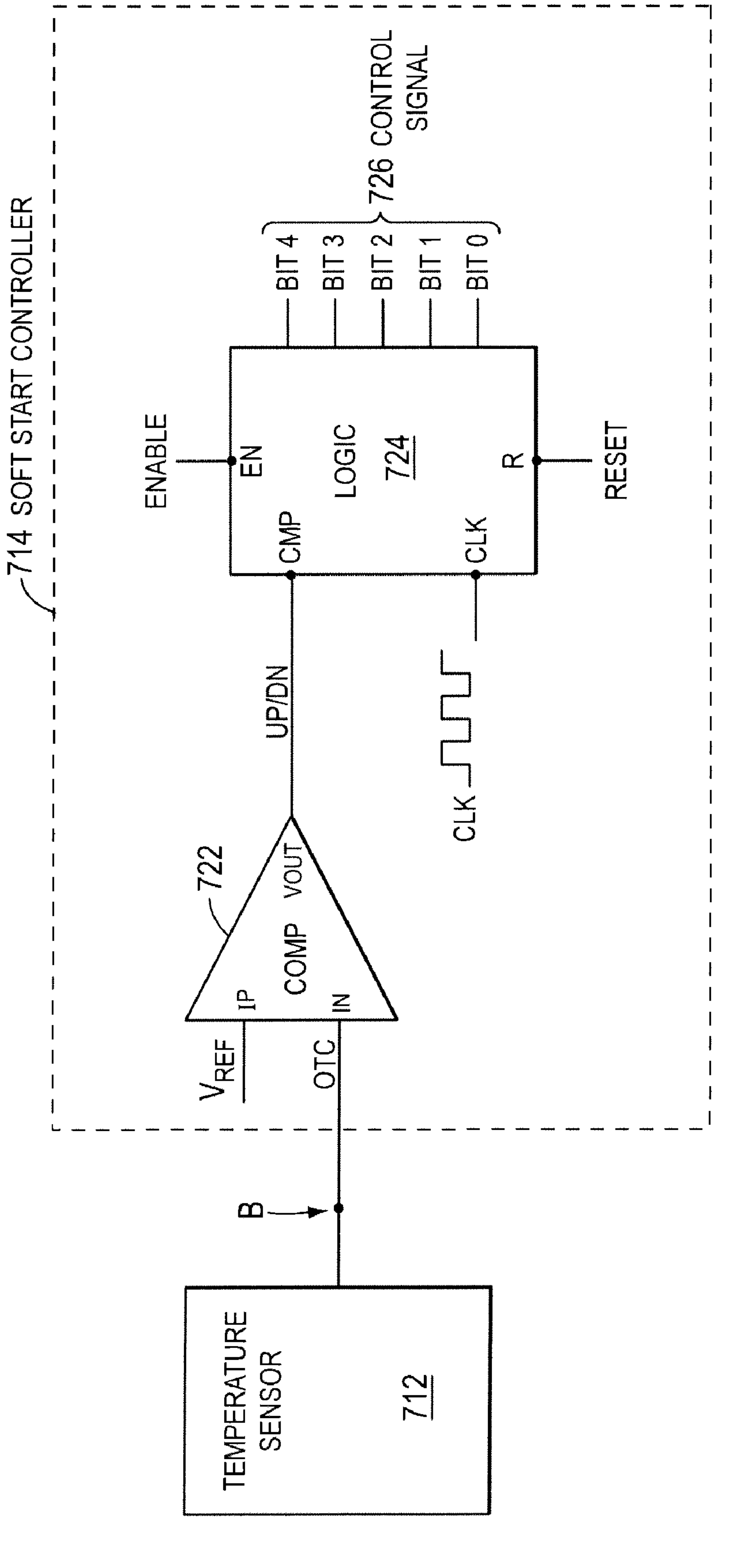
FIG. 7 is a diagram with circuit details of a temperature sensor and of a soft start controller, according to one embodiment of the invention.

FIG. 7 is a diagram with circuit details of a temperature sensor 712 and of a soft start controller 714, according to one embodiment of the invention. The temperature sensor 712 and the soft start controller 714 are operatively coupled to each other at a terminal B.

In one embodiment, the temperature sensor 712 comprises one or more temperature sensitive elements D1-D3 operatively coupled in series with each other (not shown). The temperature sensitive elements D1-D3 are typically adapted to allow current to flow in one direction (normal ON position) and to prevent current from flowing in the opposite direction. Examples of temperature sensitive elements D1-D3 include bipolar junction diodes, thermistors, transistors, and any other temperature sensitive devices that exhibit inverse proportionality characteristics. When a temperature sensitive element D1-D3 operates in the normal ON position, the forward voltage drop, $V_6$, is inversely proportional to its absolute temperature. In operation, collectively, the combination of temperature sensitive elements D1-D3 regulates the output current (i.e., the charge current flowing to the charge storage device) to maintain a certain temperature level. Regulating may include increasing the output current one or more incremental steps followed by decreasing the output current one or more incremental steps as illustrated in FIG. 3B. The soft start controller 714 in cooperation with the soft start component (e.g., soft start component 616) initially increase this current level slowly to a current limit value. The current limit controller 618 thereafter maintains the current and thus the power level at or below a predetermined power limit value.

In this example, the soft start controller 714 comprises a comparator 722 and logic circuitry 724. The comparator 722 is operatively coupled, at terminal B, to the temperature sensor 712. The comparator 722 may include two inputs and an output. One of the inputs may be an on the chip (OTC) input operatively coupled to terminal B and adapted to receive the voltage at terminal B. The voltage at terminal B tends to decrease with temperature. Another one of the inputs may be a $V_{REF}$ input adapted to receive a bandgap reference voltage. A bandgap reference voltage may be a zero temperature coefficient voltage reference. Generally, a component exhibiting a zero temperature coefficient of resistivity changes from negative to positive values at an absolute zero temperature (i.e., at zero Kelvin). Thus, the zero temperature voltage reference does not vary with temperature in a typical charge power control scheme.

The comparator 722 is adapted to compare the voltages (i.e., $V_{REF}$ and the voltage at terminal B) applied at its inputs and to output a signal, UP/DN, for commanding the logic circuitry 724 to increase or decrease the charge current. In one embodiment, the logic circuitry 724 includes a counter 724 adapted to count up or down. Such counter 724 may be adapted to receive the UP/DN signal and to count up and down between an upper and a lower limit and to count only down if it reaches the upper limit. Likewise, the counter 724 may be adapted to count only up if it reaches the lower limit. The counter 724 may further be adapted to output a control signal 726. The control signal 726 may include control bits (e.g., BIT0-BIT 5). The number of bits in the control signal 726 may depend on a desired resolution of current steps, such as the resolution of the incremental steps shown in FIG. 3B. In general, the resolution tends to increase with increases in the number of temperature sensitive elements included in the temperature sensor 712.

The counter 724 is also adapted to receive a clock, signal CLK, which controls the timing of the counting up or down. The counter 724 can be reset in response to a RESET signal.

For example, based on the voltages applied to its inputs, the comparator 722 may determine that the current should he increased and output an UP signal. At the next CLK signal, the counter 724 may, in response to the UP signal, count up one or more steps, provided that the upper limit has not been reached. The counter 724 then outputs control bits 726 which may include a change to the state of one or more of the bits. For example, BIT4 may be asserted (or BIT2 negated). Upon receipt of the asserted BIT4, the soft start component (not shown) may switch one of its current switches, e.g., SW4, to an ON state, allowing current to flow through that current switch which in turn may increase the charge current. Negated BIT2 may cause SW2 to switch to an OFF state and to cut off current flow through it, reducing the current somewhat (i.e., producing current decrease with an UP count). Similarly, in response to a DN signal, the counter 724 may count down one or more steps (provided that it has not reached its lower limit) and may output control bits 726 that command the soft start component to switch one or more current switches OFF so as to decrease the charge current. Returning to the first example, if the counter 724 has already reached its upper limit, the counter 724 may output the same control bits 726 in response to an UP signal. The control bits 726 may not be changed until the counter 724 receives a DN signal from the comparator 722. In some embodiments, the upper and/or lower limit of the counter 724 may be determined by or otherwise related to the current limit, for example, the current limit detected by the current limit controller 618.

FIG. 8 is a diagram of a charge power control scheme 800, including circuit details of a pass element 802, according to one embodiment of the invention. This embodiment includes the temperature sensor 612, the soft start controller 614, the soft start component 616, the current limit controller 618, the current limit detector 620 (here illustrated delineated separately from the current limit controller 618), the current, limit converter 630, the pass element 802, the charge storage device 506, and the system load 512. The pass element 802 includes current switches T10 and T11, an operational amplifier 804, and a resistor, $R_S$. The temperature sensor 612, the soil start controller 614, the soft start component 616, the current limit controller 618, the current limit detector 620, the current limit converter 630, the charge storage device 506, and the system load 512 may each be substantially similar to their respective corresponding element in FIGS. 5-7.

In this embodiment, the current switch T10 is a large scale transistor and the current switch T11 is a small scale transistor. T10 is scaled 1× and T11 is scaled 0.002×. Size matching may be important to match transistor criteria, for transistor scaling (i.e., decreasing device dimensions), and the like. Transistors of a particular scale (i.e., size) are typically laid out in the same region on the IC die (e.g., on IC die 400 of FIG. 4). The transistors T10, T11 are operatively coupled to each other, to the current limit controller 618, and via the current limit converter 630 to the soft start component 616. The transistors T10 and T11 are operative to be turned ON and OFF and to cause current switches (not shown) included in the soft start component 616 to be turned ON and OFF. The source of T10 is operatively coupled to an inverting input of the operational amplifier 804. The source of T11 is operatively coupled to a non-inverting input of the operational amplifier 804.

When turned ON, the small scale transistor T11 is operative to output a small scale current, I, to the non-inverting input of the operational amplifier 804. When, turned ON, the large scale transistor T10 is operative to output a large scale current, $I_{OUT}$, to the inverting input of the operational amplifier 804. The currents have a substantially fixed ratio between them determined by the size ratio of T10 and T11. In the illustrated embodiment, that size ratio is 500 (1/0.002=500). T10 is thus a current mirror to T11 and magnifies the small scale current by a factor of 500.

In the illustrated embodiment, $R_S$ is connected between the inverting and the non-inverting inputs of the operational amplifier 804. As described, the operational amplifier 804 receives I at its non-inverting input and $I_{OUT}$ at its inverting input. The differential input voltage to the operational amplifier 804 is therefore $R_S \times (I \sim I_{LIM})$. The operational amplifier 804 is operative to output a current responsive to the differential input voltage. Such output current is fed back to the respective gates of T10 and T11. As noted with reference to FIG. 2, generally, a pass element is a controlled variable resistance device. It may be driven by an amplified error signal and be operative to increase its resistance when the output current is to be lowered and to decrease its resistance when the output current is to be raised. As may be seen from FIG. 8, the error signal may be the difference between currents I and $I_{OUT}$. The amplification of such error signal may be performed via the gain of the operational amplifier 804 alone or in combination with the size ratio of T10 and T11. Whether the output current is to be raised or lowered depends on the relationship between the current limit, $I_{LIM}$, flowing to the current limit converter 630 and the small scale current I.

Briefly, if the small scale current, I, is greater than the current limit $I_{LIM}$, the operational amplifier 804 tries to reduce the current until I substantially equals $I_{LIM}$. The reduction may be obtained by turning OFF the small scale transistor T11. If I is below $I_{LIM}$, the operational amplifier 804 substantially maintains I at or below $I_{LIM}$. Such maintaining may be obtained by turning both transistors T10 and T11 ON, resulting in a higher current.

If More specifically, if the small scale current, I, is greater than the current limit, $I_{LIM}$, the balance of current (i.e., $I-I_{LIM}$) flows via $R_S$. The differential input voltage to the operational amplifier becomes $(I-I_{LIM}) \times R_S$, which triggers the operational amplifier 804 to reduce the current until I substantially equals $I_{LIM}$. The output current from the operational amplifier 804 thus causes the transistor T11 to be turned OFF, which reduces the current output from T11. This reduction may occur gradually or fast depending on, at least in part, the gain of the operational amplifier 804. In some embodiments, a faster turn-off may be advantageous.

If I is below $I_{LIM}$, the output current from the operational amplifier 804 may cause T10 and T11 to be turned ON, thereby exhibiting low resistance and in turn increasing I. This may cause I to be substantially maintained at or below $I_{LIM}$. The value of $I_{OUT}$ may be, for example, 500×1. The net effect is that the charge power control scheme 800 regulates the current to decrease to $I_{LIM}$ and to thereafter remain substantially at or below $I_{LIM}$.

The resistor, $R_S$, may be a current sensing resistor adapted to translate current into a voltage. In general, current sensing resistors are designed for low resistance so as to minimize power consumption. The calibrated resistance senses the current flowing through it in the form of a voltage drop, which may be detected and monitored by control circuitry (e.g., by the operational amplifier 804).

Various configurations of the embodiments disclosed herein are possible. For example, the current switches T10, T11 may include transistors, such as FETs, such, as JFETs, MOSFETs, or any combination thereof. The current switches may also include BJTs, in which ease the earlier reference to gate and source (the terms for N-channel FETs) corresponds to base and emitter (the terms for NPN BJTs). The resistor, $R_S$, may include a resistor other than a current sensing resistor; however, in some configurations, this may result in less than optimal performance. For example, the power consumption may be less than optimally minimized, more components may need to be used, or the like.

FIG. 9 is a diagram of the charge power control scheme of FIG. 8, including circuit details of a soft start component 616 and a pass element 802, according to one embodiment of the invention. This embodiment includes the temperature sensor 612, the soft start controller 614, the current limit controller 618, the current limit detector 620, the soft start component 616, the current converter 630, and the pass element 802.

In this embodiment, the soft start component 616 includes switches SW1-SW5 for controlling incremental current steps of the soft start, operational amplifier 902, current switches T1-T9, and a soft start resistor, $R_{SS}$. The current switches T1-T9 may be transistors. The operational amplifier 902 is coupled, at one of its inputs, to the current limit detector 620 and at another one of its inputs to a terminal C. The operational amplifier 902 is operative to receive the current limit detected by the current limit detector 620 and to compare the received current limit with the soft start current $I_{SS}$, which is the sum of the currents I1-I5. The soft start current is further related to the output current, $I_{OUT}$, for example, by a factor dependent on the size ratios of the current mirrors.

The soft start component 616 is operative to receive the control signal 626 output from the logic circuitry 624 (included, in the soft start control 614) and to change the state of one or more of the switches SW1-SW5 in response thereto (ON/OFF). In operation, for example, if only current switch T1 is turned ON (i.e., T2-T5 are turned OFF), current I1 will flow to the gates of current switches T6 and T7. This may cause current switches T6 and/or T7 to turn ON, which may cause current to flow to the soft start controller 614. The current switch T7 is operatively coupled to the gates of current switches T8 and T9. Current flowing from current switch T7 may turn ON current switches T8 and/or T9. Current may then flow from current switch T9 via the current limit converter 630 to the pass element 802.

The current switches T1-T5 may be scaled, in one embodiment, T1 may be scaled 1×, T2 scaled 2×, T3 scaled 4×, T4 scaled 8×, and T5 maybe scaled 16×. In order to increase resolution, in this embodiment, the control signal 626 comprises five control bits, BIT0-BIT4, each control bit controlling one of the switches SW1-SW5. Generally, as the number of control bits included in the control signal 626 increases, the resolution achievable in the incremental steps of die charge current, $I_{OUT}$, output from the pass element 802 increases as well. If the control, signal 626 is (from most significant bit to least significant bit) 00001, i.e., BIT0 is high, current I1 will flow to the gates of transistors T6 and T7 as SW1 is turned ON. If instead the control signal 626 is 10000, current I5 will flow to the soft start controller 614 and to the source of transistors T6 and T7. In this example, with five control bits, I5 may be thirty-two times greater than I1 (because $2^5=32$), based on the size ratio of T5 and T1. In another embodiment, the current switches T1-T5 may be scaled differently, for example logarithmically, exponentially, or the like. The level of the currents I1-I5 may then be likewise related logarithmically, exponentially, etc. Other combinations of current switches T1-T5, switches SW1-SW5, or both are possible.

In the illustrated embodiment, current switches T6 and T7 form one current mirror and current switches T8 and T9 another current mirror. In this embodiment, the soft start current, $I_{SS}$, flowing through the soft start resistor, $R_{SS}$, may need to be small by design. By including multiple current mirrors, the current eventually output as $I_{OUT}$ can be successively increased. For example, the size ratio between the scales of the current switches T8 and T9 may be higher than the size ratio of T6 and T7. The successive increase in size ratios between the current mirrors may be linear, logarithmic, exponential, or have any other relationship.

The charge current is thus controlled by the soft start controller 614 and the soft start component 616 and thereby increased in incremental steps up to a current limit. The charge current is further controlled by the current limit controller 618 so as not to exceed the current limit. The current limit is detected by the current limit detector 620 and is associated with a predetermined power limit value of power dissipated across the pass element 802. Collectively, the elements of the charge power control scheme 900 cooperate to control the power and thus the current flowing in the pass element 802, which in turn regulates the charge current, $I_{OUT}$, flowing to the charge storage device, the system load, or both (not shown).

Figure 10:
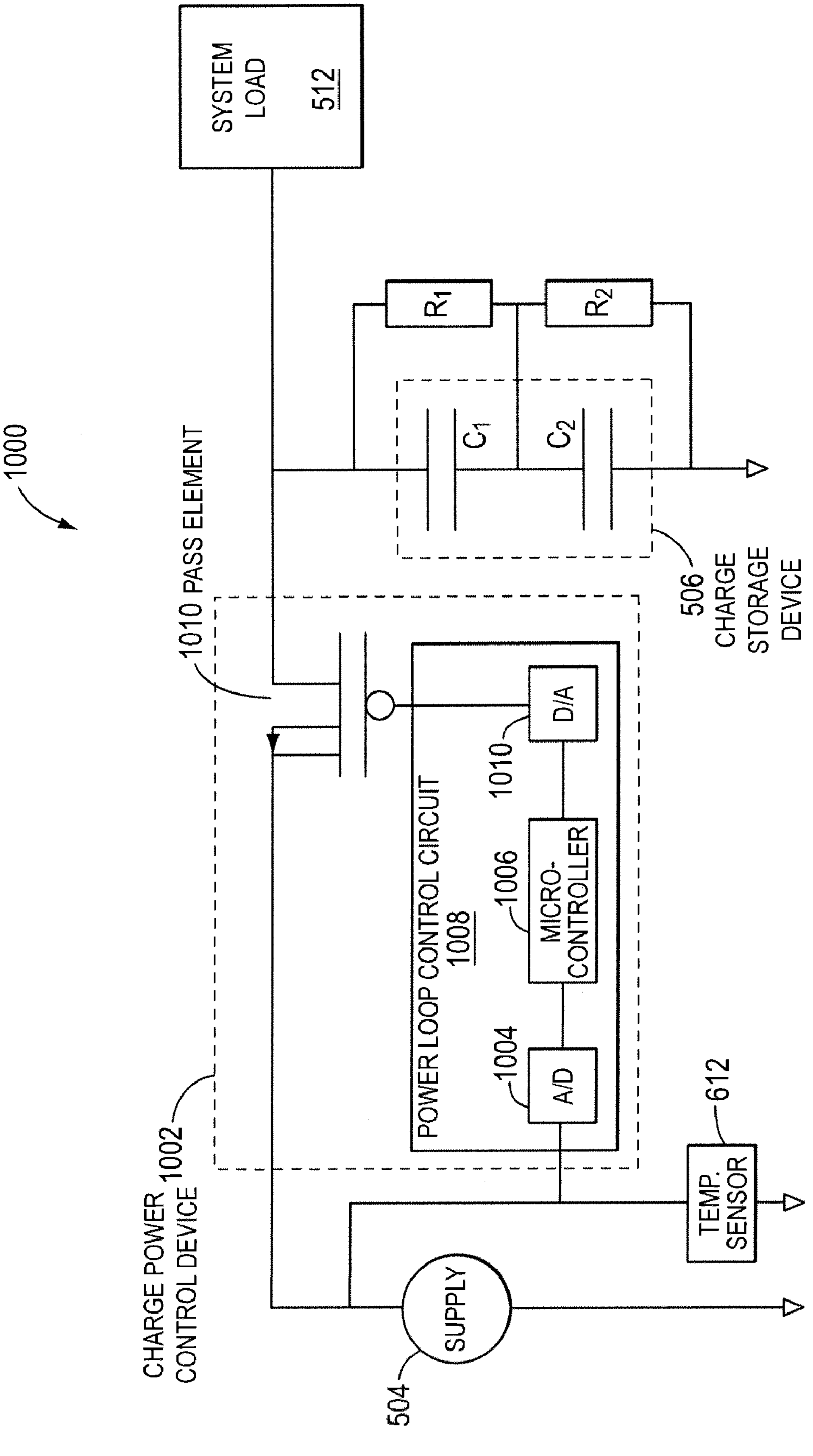
FIG. 10 is a block diagram of another charge power control scheme, according to one embodiment of the invention.

FIG. 10 is a block diagram of another charge power control scheme 1000, according to one embodiment of the invention. This scheme 1000 includes the supply 504, the temperature sensor 612, a charge power control device 1002, the charge storage device 506, and the system load 512. In this embodiment, the charge power control device 1002 includes a power loop control circuit 1008 implemented as a combination of an analog-to-digital converter (A/D) 1004, a microcontroller 1006, and a digital-to-analog converter (D/A) 1010. The microcontroller 1006 may he any type of processor. The microcontroller 1006 is operative to output the control signal 626 (e.g., control bits 626) to the D/A 1010. The control signal 626 is operative to change the state of the soft start component switches (e.g., SW1-SW5 of FIG. 9) as well as current switches included elsewhere in the charge power control scheme (e.g., T1-T11), and to, thereby, control the current flowing through the pass element 1010.

Figure 11:
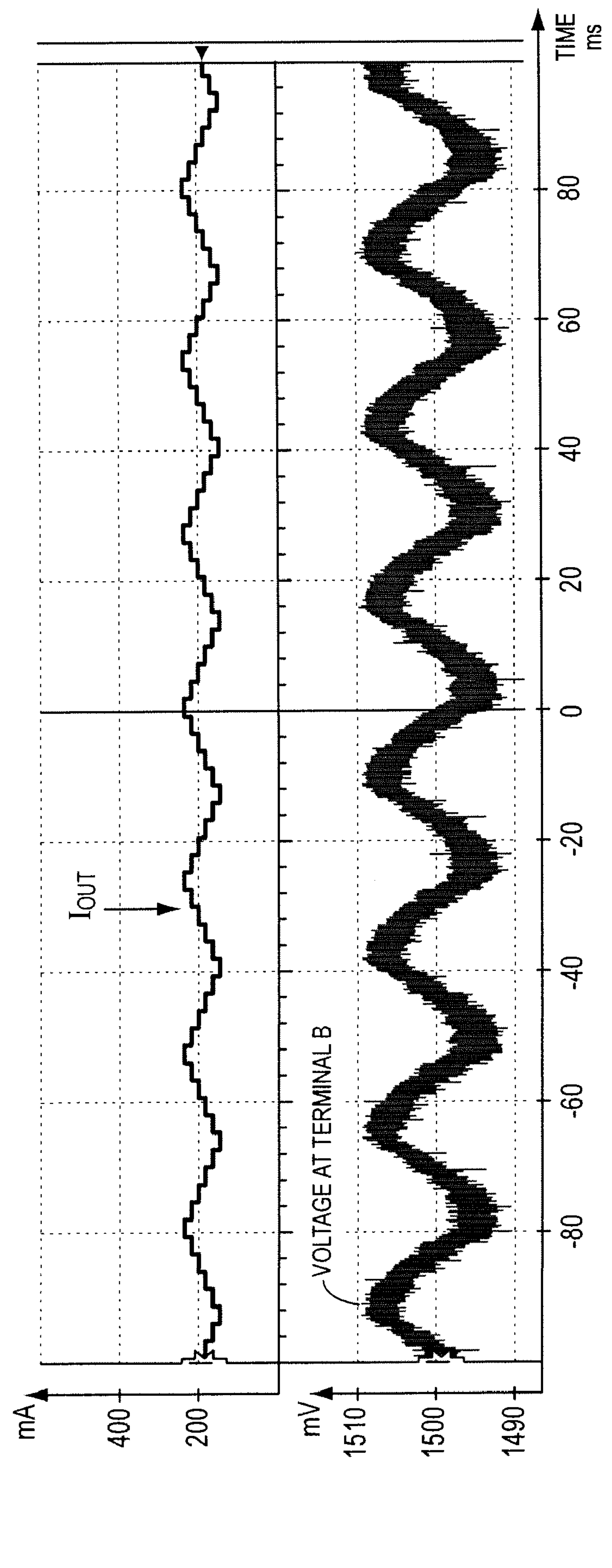
FIG. 11 is a diagram illustrating a charge current level through a pass element regulated according to one embodiment of the invention.

FIG. 11 is a diagram illustrating a charge current level, $I_{OUT}$, through a pass element regulated according to one embodiment of the invention. The voltage at the terminal B may be the voltage at the temperature sensor and applied to input OTC of comparator 722 as illustrated in FIG. 7.

One or more elements of the charge power control scheme, such as the charge power control device, may be implemented in a number of ways. An implementation may use discrete components, or, preferably, be embodied in an IC or as a functional block in an IC. Such IC may further be adapted for use in a mobile device. Examples of mobile devices include laptops, cell phones, digital cameras, personal digital assistants (PDAs), game boys, other battery-operated toys, and the like.

In sum, although the invention has been described in considerable detail with reference to certain preferred embodiments thereof other embodiments are possible. Therefore, the spirit and scope of the appended claims should not be limited to the description of the preferred embodiments contained herein.

What is claimed is:

1. A device for controlling power, comprising:

a pass element adapted to conduct a charge current; and a power loop control circuit including a soft start controller and a soft start component, the soft start controller being adapted to produce a control signal corresponding to incremental steps of the charge current through the pass element and the soft start component being adapted to manage charge current increases in incremental steps up to a current limit in accordance with the control signal, wherein the current limit is associated with a predetermined power limit value of power dissipated across the pass element.

2. A device as in claim 1, wherein the control signal includes one or more control bits.

3. A device as in claim 2, wherein a number of the one or more control bits is related to a number of the incremental steps.

4. A device as in claim 2, wherein a number of the one or more control bits is related to a predetermined resolution with which the soft start controller allows the charge current to approach the current limit.

5. A device as in claim 1, wherein the soft start controller includes a comparator and logic circuitry, the comparator being adapted to produce a logic signal for prompting the logic circuitry to increase and decrease the incremental steps, the logic circuitry being adapted to adjust the control, signal when increasing and decreasing the incremental steps.

6. A device as in claim 5, wherein the logic circuitry includes a counter and wherein the comparator is adapted to produce an UP/DN signal for prompting the counter to count up and down, the counter being adapted to adjust the control signal when counting up and down.

7. A device as in claim 6, wherein the soft start controller further includes a constant current source operatively coupled to the comparator.

8. A device as in claim 5, further comprising a temperature sensor operatively coupled to the soft start controller and adapted to produce a sensor signal in response to which the comparator produces the logic signal.

9. A device as in claim 8, further comprising a zero coefficient temperature voltage reference, wherein the comparator is operatively connected to the temperature sensor and to the zero coefficient temperature voltage reference and adapted to produce the logic signal in response thereto.

10. A device as in claim 8, wherein the temperature sensor includes one or more temperature sensitive elements operatively coupled in series with each other.

11. A device as in claim 10, wherein each temperature sensitive element has a forward voltage drop that is inversely proportional to its absolute temperature, and wherein, collectively, the temperature sensitive elements maintain a predetermined temperature level by regulating the charge current between the incremental steps.

12. A device as in claim 10, wherein the temperature sensitive elements include a bipolar junction diode, a thermistor, or a transistor, or a combination of one or more thereof.

13. A device as in claim 8, wherein the temperature sensor is incorporated, in full or in part, within the power loop control circuit.

14. A device as in claim 6, wherein the counter is adapted to count up and down between an upper limit and a lower limit.

15. A device as in claim 14, wherein the counter is further adapted to count only down if it reaches the upper limit and to count only up if it reaches the lower limit.

16. A device as in claim 1, wherein the soft start component includes one or more current switches adapted to turn ON and OFF in response to the control signal.

17. A device as in claim 15, wherein the one or more current switches include transistors.

18. A device as in claim 1, further comprising a current limit controller with current limit detector operatively coupled to the pass element and operative to detect the current limit and to manage the charge current by limiting it to at or below the current limit.

19. A device as in claim 1, wherein the soft start controller, the soft start component, or both, are implemented using a microcontroller.

20. A device as in claim 19 further implemented wherein the microcontroller is operatively connected at its input to an analog-to-digital converter (ADC) and at its output to a digital-to-analog converter (DAC).

21. A device as in claim 20, further comprising a temperature sensor, wherein the ADC is operatively coupled to the temperature sensor and the DAC is operatively coupled to the pass element.

22. A device as in claim 1, wherein the power loop control circuit is adapted to regulate the charge current once it is at or about the current limit such that the power dissipated across the pass element does not exceed the predetermined power limit value.

23. A device as in claim 22, wherein the power loop control circuit is adapted to produce the regulated charge current, for a charge storage device, a system load, or both.

24. A device as in claim 1, wherein the pass element comprises one or more transistors constructed as a bipolar junction transistor (BJT), a junction field effect transistor (JFET), a metal oxide semiconductor FET (MOSFET), and an insulated gate bipolar transistor (IGBT).

25. A device as in claim 1 embodied in an integrated circuit (IC) or a functional block of an IC.

26. A device as in claim 25, wherein die IC is divided into die areas, each die area being adapted for devices of a different scale.

27. A device as in claim 26, wherein a temperature sensor associated with the power loop control circuit is placed on a die area where a heat source including the pass element is present.

28. A method for controlling power, comprising:

increasing a charge current through a pass element in incremental steps up to a current limit by producing in a soft start controller a control signal, the current limit being associated with a predetermined power limit value of power dissipated across the pass element;

regulating in a power loop control circuit the charge current once it is at or about the current limit; and outputting the increased then regulated charge current to a charge storage device, a system load, or both.

29. A method as in claim 28, wherein increasing the charge current is based on a resolution of the incremental steps, the control signal including one or more control bits and the resolution being related to a number of the one or more control bits.

30. A method as in claim 28, wherein increasing the charge current in incremental steps includes sensing a temperature of the power loop control circuit and maintaining a predetermined temperature level at the power loop control circuit by regulating the charge current between the incremental steps.

31. A method as in claim 28, wherein increasing the charge current in incremental steps includes increasing and decreasing the charge current by turning ON and OFF one or more current switches with the soft start controller in response to the produced control signal.

32. A method, as in claim 28, wherein the regulating includes detecting the current limit and controlling the charge current to maintain if at or below the current limit.

33. A device for controlling power, comprising:

a pass element adapted to conduct a current; and a power loop control circuit including a soft start controller and a soft start component, the soft start controller including an output for a control signal corresponding to incremental steps of the current through the pass element, the control signal being adjustable, the soft start component having being adapted to manage current increases in incremental steps up to a current limit in accordance with adjustments in the control signal, the current limit being associated with a predetermined power limit value of power dissipated across the pass element.

34. A device as in claim 33, wherein the control signal includes one or more control bits whose number relates to a number of the incremental steps.

35. A device as in claim 33, wherein the control signal includes one or more control bits whose number relates to a predetermined resolution with which the soft start controller allows the current to approach the current limit.

36. A device as in claim 33, wherein soft start controller includes logic circuitry adapted to produce the adjustable control signal at the output.

37. A device as in claim 36, wherein the soft start controller further includes a comparator and a constant current source operatively coupled to the comparator.

38. A device as in claim 36, further comprising a temperature sensor operatively coupled to the son start controller and adapted to produce a sensor signal in response to which the comparator produces an UP/DN signal for adjusting the control signal.

39. A device as in claim 38, further comprising a voltage reference wherein the comparator is operatively connected to the temperature sensor and voltage reference and is adapted to produce the UP/DN signal.

40. A device as in claim 33, wherein the soft start component includes one or more current switches with turn ON and OFF states responsive to the control signal.

41. A device as in claim 40, wherein the one or more current switches include transistors.

42. A device as in claim 33, further comprising a current limit controller with current limit detector operatively coupled to the pass element and operative to detect the current limit and to manage the current by limiting it to at or below the current limit.

43. A device as in claim 33, wherein the soft start controller, the soft start component, or both, are implemented using a microcontroller.

44. A device as in claim 43 further implemented wherein the microcontroller is operatively connected at its input to an analog-to-digital converter (ADC) and at its output to a digital-to-analog converter (DAC).

45. A device as in claim 44, further comprising a temperature sensor, wherein the ADC is operatively coupled to the temperature sensor and the DAC is operatively coupled to the pass element.

46. A device as in claim 33, wherein the power loop control circuit is adapted to regulate the current once it is at or about the current limit such that the power dissipated across the pass element does not exceed the predetermined power limit value.

47. A device as in claim 46, wherein the current is a charge current and wherein the power loop control circuit is adapted to produce the regulated, current for a charge storage device, a system load, or both.

* * * * *

UNITED STATES PATENT AND TRADEMARK OFFICE

CERTIFICATE OF CORRECTION

PATENT NO. : 7,576,525 B2
APPLICATION NO. : 11/749714
DATED : August 18, 2009
INVENTOR(S) : John So et al.

It is certified that error appears in the above-identified patent and that said Letters Patent is hereby corrected as shown below:

Column 14, line 25, "adjust the control, signal" should be changed to -- adjust the control signal --.

Column 15, line 26, "charge current, for" should be changed to -- charge current for --.

Column 15, line 35, "wherein die IC" should be changed to -- wherein the IC --.

Column 16, line 1, "method, as in" should be changed to -- method as in --.

Column 16, line 3, "maintain if at" should be changed to -- maintain it at --.

Column 16, line 31, "the son start controller" should be changed to -- the soft start controller --.

Column 16, line 66, "the regulated, current" should be changed to -- the regulated current --.

Signed and Sealed this

Sixth Day of July, 2010

David J. Kappos

David J. Kappos
*Director of the United States Patent and Trademark Office*